(12) United States Patent
Kawasaki

(10) Patent No.: US 7,327,243 B2
(45) Date of Patent: Feb. 5, 2008

(54) METHOD FOR WARNING DEFLATION OF TIRES AND SYSTEM THEREOF, AND JUDGMENT PROGRAM OF DEFLATION OF TIRES

(75) Inventor: Hiroaki Kawasaki, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 128 days.

(21) Appl. No.: 11/043,977

(22) Filed: Jan. 28, 2005

(65) Prior Publication Data

US 2005/0179528 A1 Aug. 18, 2005

(30) Foreign Application Priority Data

Feb. 16, 2004 (JP) ............................. 2004-038311

(51) Int. Cl.
*B60C 23/00* (2006.01)
(52) U.S. Cl. .................. 340/444; 340/441; 340/442; 340/443; 340/445; 340/446; 73/146.2
(58) Field of Classification Search ............... None
See application file for complete search history.

(56) References Cited

U.S. PATENT DOCUMENTS

| | | | |
|---|---|---|---|
| 6,788,191 B2 | 9/2004 | Kawasaki et al. | |
| 6,836,709 B2 | 12/2004 | Oshiro et al. | |
| 2003/0156023 A1 | 8/2003 | Kawasaki et al. | |
| 2003/0210136 A1 | 11/2003 | Oshiro et al. | |

FOREIGN PATENT DOCUMENTS

| | | |
|---|---|---|
| EP | 1 361 081 A2 | 11/2003 |
| JP | 2003-211925 A | 7/2003 |
| JP | 2003-267012 A | 9/2003 |
| JP | 2003-326927 A | 11/2003 |

*Primary Examiner*—Julie Bichngoc Lieu
(74) *Attorney, Agent, or Firm*—Birch, Stewart, Kolasch & Birch, LLP

(57) ABSTRACT

A method for warning deflation of tires which can detect the deflation of 2 wheels at the same axle including a following axle, the simultaneous deflation of 4 wheels or the abrasion of tires only by the information of wheel speeds is provided. The method comprises the steps of: detecting the rotational information of each of tires; calculating and storing wheel speeds, vehicle accelerations, slip ratios of front and rear wheels, traveling distances and radius of traveling circle from the rotational information of said respective tires; calculating moving average of the vehicle accelerations and the slip ratios of front and rear wheels; accumulating the traveling distances and storing the moving averages of the vehicle accelerations and the slip ratios of front and rear wheels; determining regression coefficient and correlation coefficient of the slip ratio of front and rear wheels on the vehicle acceleration; determining the slip ratio of front and rear wheels when the vehicle acceleration is zero; determining whether the pressures of at least 2 wheels at the same axle or 4 wheels are simultaneously reduced or not, based on the regression coefficients and the slip ratio of front and rear wheels while the vehicle acceleration is zero; and warning deflation of tires.

10 Claims, 6 Drawing Sheets

METHOD FOR WARNING DEFLATION OF TIRES AND SYSTEM THEREOF, AND JUDGMENT PROGRAM OF DEFLATION OF TIRES

BACKGROUND OF THE INVENTION

The present invention relates to a method for warning the deflation of tires and a system thereof, and a judgment program of the deflation of tires. More particularly, the present invention relates to a method for warning the deflation of tires which can detect the deflation of 2 wheels at the same axle, the simultaneous deflation of 4 wheels or the abrasion of tires and a system thereof, and a judgment program of the deflation of tires.

A detection system of the deflation of tires in an indirect system has conventionally used a principle that since the outer diameter of a tire (the dynamic loading radius of a tire) is reduced more than that of a tire having a normally prescribed pressure (normal internal pressure) when the tire is deflated, rotational angular velocity (wheel speed) is increased as compared with other normal tires. For example, a method of detecting the deflation from the relative difference of the rotational angular velocity of a tire uses as a judgment value;

$$DEL=\{(F1+F4)/2-(F2+F3)/2\}/\{(F1+F2+F3+F4)/4\}\times 100(\%)$$

(for example, refer to Japanese Unexamined Patent Publication No. 305011/1988)).

Wherein F1 to F4 are the rotational angular velocities of a front left tire, a front right tire, a rear left tire and a rear right tire, respectively.

However, since the method judges the deflation from the difference of mutual sums of the rotational angular velocities of the diagonals of 4 wheels, the simultaneous deflation of 2 wheels at the same axle and the naturally simultaneous deflation of 4 wheels could not be judged.

Consequently, the applicant proposed previously a method of detecting deflation of tires and a system thereof which can detects at least the deflation of driving wheel tires, in an indirect system using the rotational information of tires (refer to Japanese Unexamined Patent Publication No. 211925/2003).

The method described in Japanese Unexamined Patent Publication No. 211925/2003 comprises a step of detecting the rotational information of tires, a step of respectively calculating and storing wheel speeds, vehicle accelerations, slip ratios of front and rear wheels, a traveling distances and radius of traveling circle from the rotational information of respective tires, a step of calculating moving average of the vehicle acceleration and the slip ratios of front and rear wheels, a step of accumulating the traveling distance and the vehicle acceleration and the slip ratios of front and rear wheels which were transfer-averaged when the above-mentioned radius of traveling circle are a fixed value or more, a step of determining correlation coefficients with the mutual regression coefficients of the above-mentioned vehicle accelerations and the slip ratios of front and rear wheels when the accumulated traveling distances are a fixed distance or more, a step of determining whether the pressures of at least driving wheel tires are decompressed or not, by comparing the judgment value of said regression coefficients with the internal pressure reference value of regression coefficients which were preliminarily calculated by the above-mentioned step at the reference internal pressure of tires as the judgment value of regression coefficients when said correlation coefficients are a fixed value or more and a step of warning deflation of tires based on the result of said deflation judgment. In the method, the vehicle accelerations and the slip ratios based on the wheel speeds of 4 wheel tires utilizing that relation between the vehicle accelerations and the slip ratios is varied when the internal pressures of driving wheel tires are reduced, and the simultaneous deflation of one driving wheel tire or left and right driving wheel tires and the like are judged from the time dependent movement of the mutual regression coefficients.

However, since the above-mentioned method described in Japanese Unexamined Patent Publication No. 211925/2003 detects substantially the deflation of driving wheels, it cannot detect the deflation of only following wheels. Further, even if the pressures of the driving wheels are reduced, the relation of the vehicle accelerations with the slip ratios which are used as the judgment reference of deflation shows the similar tendency as a case that tires were worn; therefore it must be judged from the use duration and traveling distances of tires whether the tires are deflated or whether tires are worn. Accordingly, the method described in Japanese Unexamined Patent Publication No. 211925/2003 has a constitution that an warning for examining the air pressures of tires is carried out when an initialization switch was not operated for a fixed term, or when the total traveling distances until the initialization switch is operated again after operating the initialization switch reaches at a fixed distance.

SUMMARY OF THE INVENTION

Under the above-described circumstances, the object of the invention is to provide a method for warning deflation of tires which can detect the deflation of 2 wheels at the same axle including a following axle, the simultaneous deflation of 4 wheels or the abrasion of tires only by the information of wheel speeds and a system thereof, and a judgment program of the deflation of tires.

The method for warning deflation of tires by detecting deflation of tires based on rotational information obtained from tires mounted on a vehicle of the present invention is characterized by comprising the steps of: detecting the rotational information of each of the tires; calculating and storing wheel speeds, vehicle acceleration, slip ratio of front and rear wheels, traveling distance and radius of traveling circle of the vehicle from the rotational information of respective tires; calculating moving average of the vehicle accelerations and slip ratios of front and rear wheels; accumulating the traveling distances and storing the moving averages of acceleration and the slip ratios of front and rear wheels when the radius of traveling circle is a fixed value or more; determining regression coefficient and correlation coefficient of the slip ratio of front and rear wheels on vehicle acceleration where the accumulated traveling distance is a fixed distance or more; determining slip ratio of front and rear wheels while the vehicle accelerations are zero; determining whether the pressures of at least 2 wheels on the same axle or 4 wheels are simultaneously reduced or not, based on the regression coefficient when the correlation coefficients are a fixed value or more and the slip ratios of front and rear wheels while the vehicle accelerations are zero; and warning deflation of tires based on the result of the deflation determination.

Further, the system for warning deflation of tires by detecting deflation of tires based on rotational information obtained from tires mounted on a vehicle of the present invention is characterized by comprising: means for detecting the rotational information of each of the tires; means for calculating and storing wheel speed, vehicle acceleration, slip ratio of front and rear wheels, traveling distance and radius of traveling circle of the vehicle from the rotational information of tires; means for calculating moving average of the vehicle accelerations and slip ratios of front and rear wheels; means for accumulating the traveling distances and storing the moving average of vehicle accelerations and the slip ratios of front and rear wheels while the radius of traveling circle of vehicle is a fixed value or more; means for determining regression coefficient and correlation coefficient of the slip ratio of front and rear wheels on vehicle acceleration where the accumulated traveling distance is a fixed distance or more; means for determining the slip ratios of front and rear wheels while the vehicle acceleration is zero; means for determining whether the pressures of at least 2 wheels on the same axle or 4 wheels are simultaneously reduced or not, based on the regression coefficient when the correlation coefficients are a fixed value or more and the slip ratios of front and rear wheels while the vehicle accelerations are zero; and means for warning deflation of tires based on the result of the deflation determination.

Further, the program for judging deflation of tires of the present invention is characterized by comprising: means for calculating and storing wheel speed, vehicle acceleration, slip ratio of front and rear wheels, traveling distance and radius of traveling circle of the vehicle from rotational information of tires; means for calculating moving average of the vehicle accelerations and slip ratios of front and rear wheels; means for accumulating the traveling distances and storing the moving average of vehicle accelerations and the slip ratios of front and rear wheels while the radius of traveling circle of vehicle is a fixed value or more; means for determining regression coefficient and correlation coefficient of the slip ratio of front and rear wheels on vehicle acceleration where the accumulated traveling distance is a fixed distance or more; means for determining the slip ratios of front and rear wheels while the vehicle acceleration is zero; and means for determining whether the pressures of at least 2 wheels on the same axle or 4 wheels are simultaneously reduced or not, based on the regression coefficient when the correlation coefficients are a fixed value or more and the slip ratios of front and rear wheels while the vehicle acceleration is zero.

DETAILED DESCRIPTION

The method for warning deflation of tires of the invention and a system thereof, and a program for judging deflation of tires are illustrated below based on the attached drawings.

Figure 1:
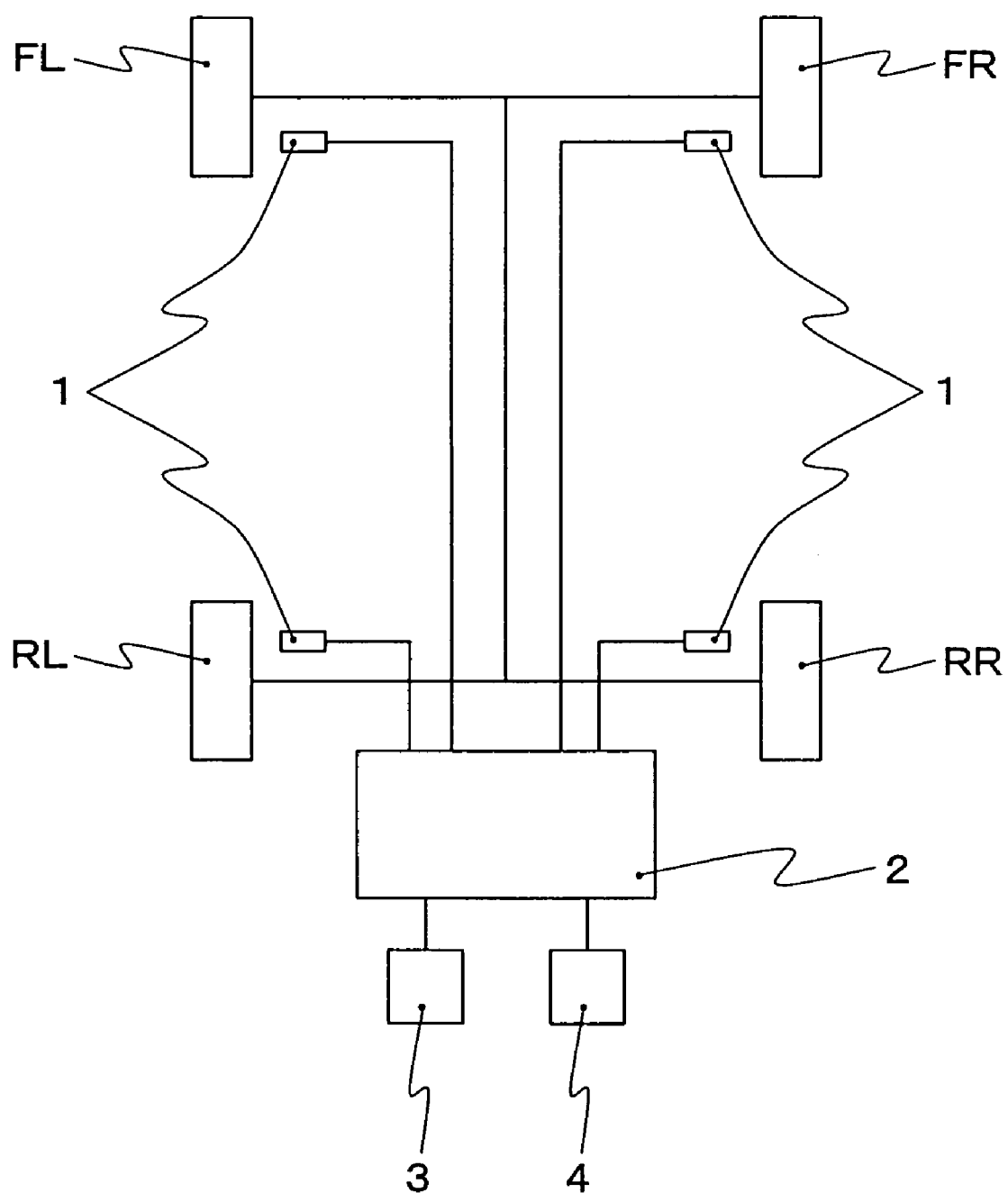
FIG. 1 is a block chart showing the Embodiment of the system for warning deflation of tires of the invention.

As shown in FIG. 1, the system for warning deflation of tires related to an embodiment of the invention detects whether the four tires, FL, FR, RL and RR (hereinafter, named generically as Wi. Wherein i =1 to 4, 1: front left tire, 2: front right tire, 3: rear left tire and 4: rear right tire) which were provided on a vehicle with 4 wheels are deflated or not, and is equipped with popular rotational information detection means 1 which were provided being respectively related with respective tires Wi.

As the above-mentioned rotational information detection means 1, there can be used a wheel speed sensor for generating rotary pulses using an electromagnetic pickup and the like and measuring the wheel speeds (rotational speeds) of rotational speed information from the number of pulses. The outputs of the above-mentioned rotational information detection means 1 are provided to the control unit 2 which is a computer such as ABS. With the control unit 2, there are connected a deflation alarming device 3 which was constituted by a liquid crystal display, a plasma display system or a CRT for informing a tire whose air pressure was reduced and an initialization switch 4 which is operated by a driver when a tire was replaced or the reference internal pressure (normal air pressure) of a tire was adjusted. The above-mentioned initialization switch 4 resets the reference value which has been held by operating when a tire was replaced or adjusted to a normal internal pressure, and new reference value is set.

Figure 2:
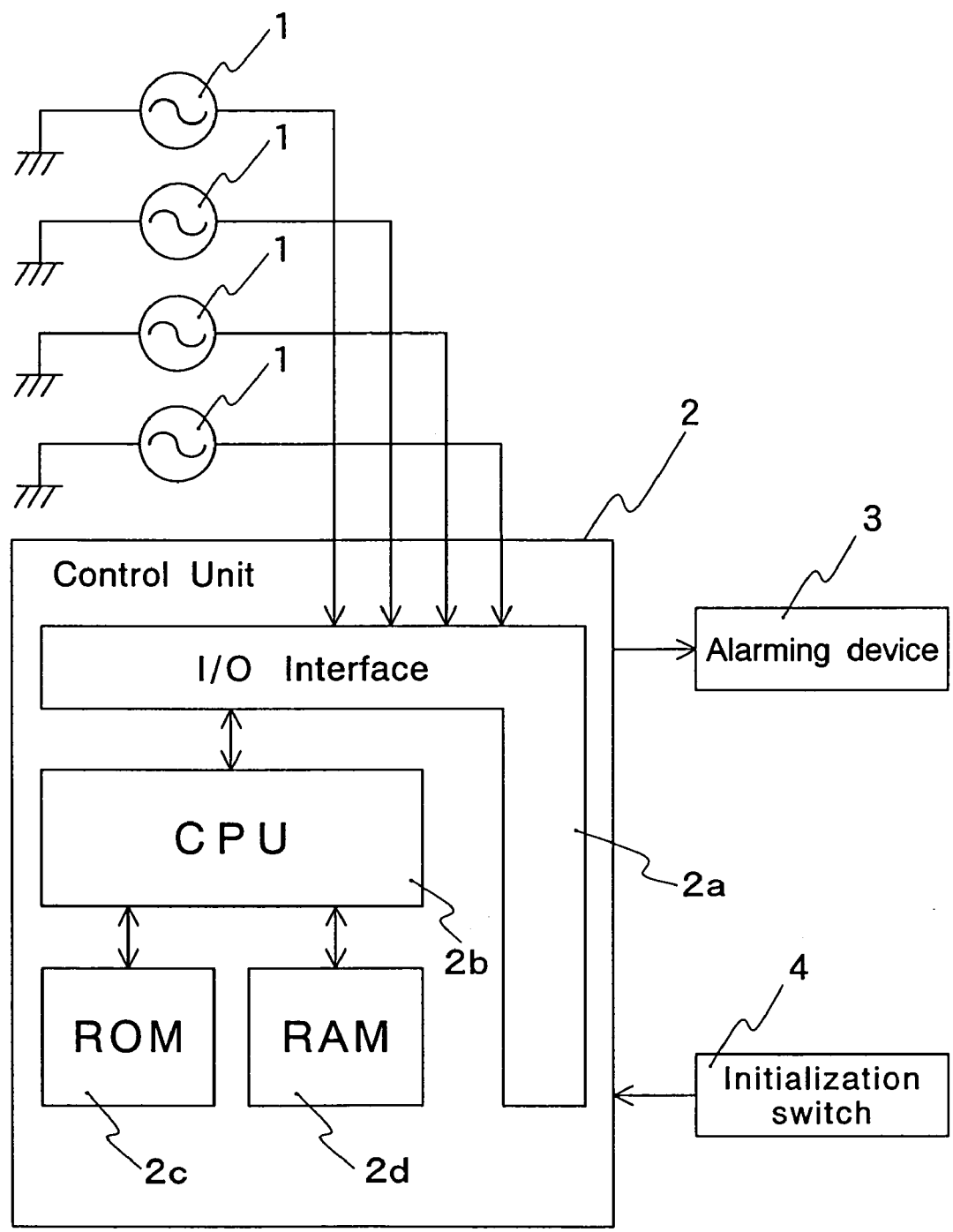
FIG. 2 is a block chart showing the electric composition of the system for warning deflation of tires shown in FIG. 1.

As shown in FIG. 2, the above-mentioned control unit 2 is composed of an I/O interface $2a$ which is necessary for transferring signals with external systems, a CPU $2b$ functioning as the center of processing, a ROM $2c$ in which the control operation program of the CPU $2b$ was stored, and a RAM $2d$ in which data are temporarily written and the written data and the like are read out when the above-mentioned CPU $2b$ carries out control operation.

In the Embodiment, the deflation of tires and the abrasion of tires are detected by combining the change of the regression coefficient of the slip ratio of front and rear wheels on the vehicle acceleration with the change of the slip ratios of front and rear wheels while the vehicle acceleration is zero. However, since detection and judgment are carried out by averaging right and left wheel speeds, the deflation of only one wheel reduces the accuracy of detection. Consequently, the accuracy of the judging deflation can be improved by using the system for warning deflation of tires related to the Embodiment in combination with a conventional system for detecting the deflation by relatively comparing the rotational information of tires (the deflation of one wheel can be precisely detected).

Accordingly, the Embodiment is composed of the rotational information detection means 1 of detecting the rotational information of each of the above-mentioned tires Wi, the first calculation processing means of respectively calculating and storing wheel speeds, vehicle accelerations, the slip ratios of front and rear wheels, traveling distances and radius of traveling circle of the vehicle from the rotational information of the respective tires Wi, the second calculation processing means of calculating moving average of the above-mentioned vehicle accelerations and the slip ratios of front and rear wheels, a means of accumulating the traveling distances and storing the moving average of the vehicle accelerations and the slip ratios of front and rear wheels while the above-mentioned radius of traveling circle of the vehicle is a fixed value or more, the third calculation processing means of determining regression coefficient and correlation coefficient of the slip ratio of front and rear wheels on the vehicle acceleration when the accumulated traveling distance is a fixed distance or more, the fourth calculation processing means of determining the slip ratio of front and rear wheels while the vehicle acceleration is zero, a deflation judgment means of determining whether the pressures of at least 2 wheels at the same axle or 4 wheels are simultaneously reduced or not, based on the regression coefficient where the above-mentioned correlation coefficient is a fixed value or more and the slip ratios of front and rear wheels while the vehicle acceleration is zero, and a deflation alarming device 3 of warning deflation of tires based on the result of the deflation judgment.

Further, it is equipped with the fifth calculation processing means of calculating the fluctuation of difference between slip ratio of left front and rear tires and slip ratio of right front and rear tires from the wheel speeds of respective tires and correction means of correcting the regression coefficient in accordance with average of the fluctuation of difference by every fixed distance of traveling.

Further, the program for judging deflation of tires of the control unit 2 in the Embodiment comprises the first calculation means for calculating and storing wheel speed, vehicle acceleration, slip ratio of front and rear wheels, traveling distance and radius of traveling circle of the vehicle from rotational information of tires, the second calculation means for calculating moving average of the vehicle accelerations and slip ratios of front and rear wheels, an accumulation means for accumulating the traveling distances and storing the moving average of vehicle accelerations and the slip ratios of front and rear wheels while the radius of traveling circle of vehicle is a fixed value or more, the third calculation means for determining regression coefficient and correlation coefficient of the slip ratio of front and rear wheels on vehicle acceleration where the accumulated traveling distance is a fixed distance or more, the fourth calculation means for determining the slip ratios of front and rear wheels while the vehicle acceleration is zero, and means for determining whether the pressures of at least 2 wheels on the same axle or 4 wheels are simultaneously reduced or not, based on the regression coefficient when the correlation coefficients are a fixed value or more and the slip ratios of front and rear wheels while the vehicle acceleration is zero.

Further, the program for judging deflation of tires in the Embodiment comprises the fifth calculation means for calculating fluctuation of difference between slip ratio of left front and rear tires and slip ratio of right front and rear tires from the wheel speeds of respective tires, and means for correcting the regression coefficient in accordance with average of the fluctuation of difference by every fixed distance of traveling.

Figure 3:
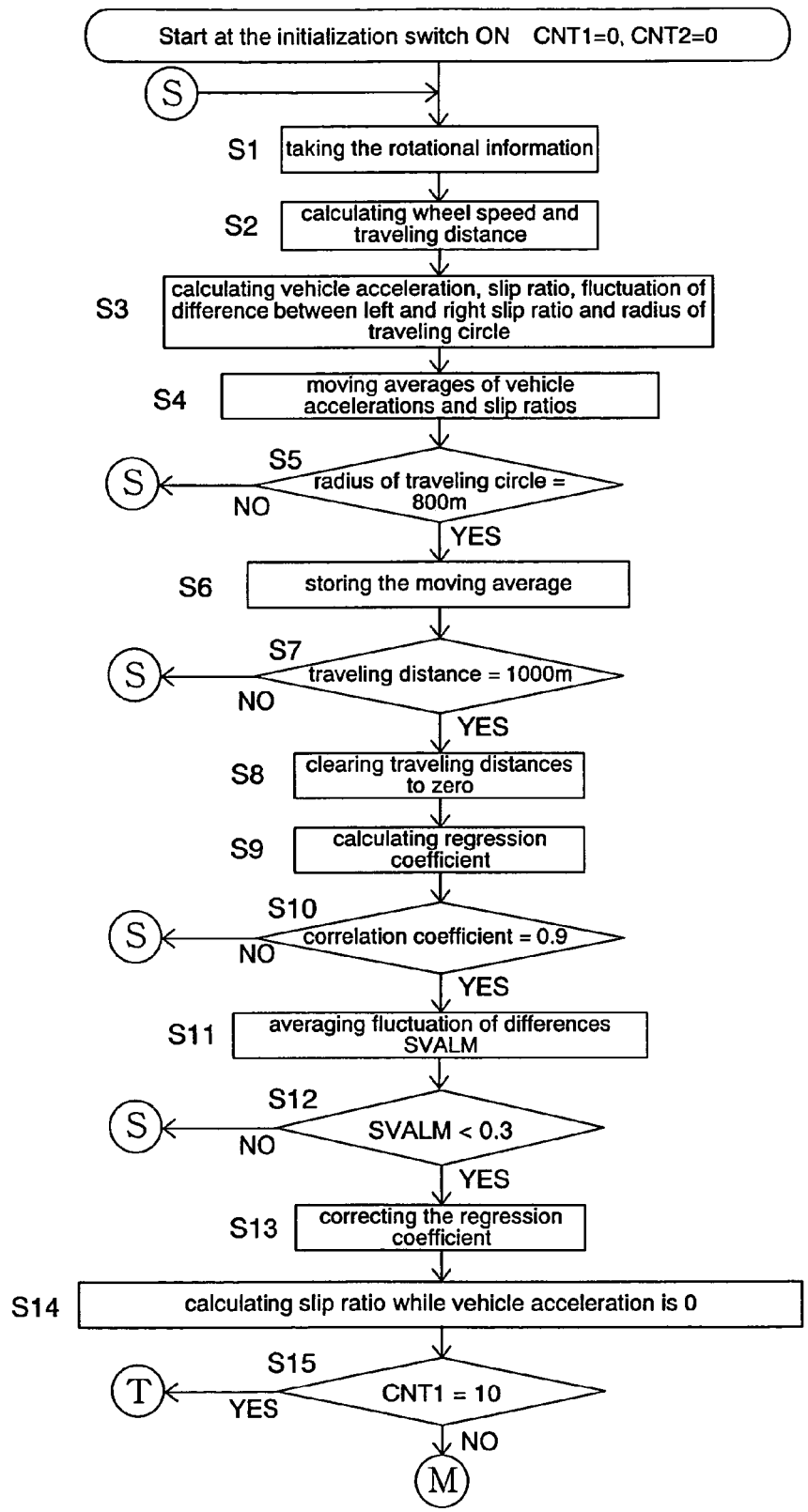
FIG. 3 is one example of flow charts related to the system for warning deflation of tires of the invention.

Then, concerning the procedure for determining the relation between the above-mentioned vehicle accelerations and the slip ratios, a case of the simultaneous deflation of 4 wheels is illustrated as an example. Firstly, as shown in FIG. 3, after taking in the rotational information, the wheel speeds and traveling distances are calculated (steps S1 and S2), and then, the vehicle accelerations, the slip ratios of front and rear wheels, the fluctuation of the difference between the left and right slip ratios and the radius of a travel path, or traveling circle, of the vehicle are calculated (step S3). Further, the fluctuation of the difference between the left and right slip ratios in the step S3 are described later.

Then, the moving average of the vehicle accelerations and the slip ratios of front and rear wheels are calculated (step S4). Then, when the radius of traveling circle is a fixed value or more, for example, 800 R or more, the moving average of the vehicle accelerations and the slip ratios are stored (steps S5 and S6). Further, the radius of traveling circle is prescribed for excluding influence caused by acceleration to lateral direction during turning.

Then, when the traveling distances reach at a fixed value, for example, at 1000 m (step S7), the regression coefficient K1 (the regression coefficients of the slip ratio of front and rear wheels on the vehicle acceleration) and the correlation coefficient R of the vehicle accelerations and the slip ratios are determined (steps S9 and S10). The regression coefficient K1 where the correlation coefficient R is, for example, 0.9 or more is the relation between the vehicle acceleration and the slip ratio mentioned hereat and the regression coefficient K1 is referred to as the deflation judgment value. Hereat, the traveling distances are cleared to zero (step S8) so that the deflation of tires can be detected by data by every 1000 m. For example, when detection is carried out by data of 5000 m or more, data by a lot of 5000 m are accumulated; therefore data are uneven because of various factors such as a road surface μ, the gradient of a road surface and the traveling distance and the correlation coefficients of the regression coefficients are hardly a fixed value or more. Further, when the distances are too short inversely, the correlation coefficient becomes high but possibility that the regression coefficients become uneven is enhanced because of influence of the road surface μ. Consequently, when the traveling distances reach at a fixed value, it is cleared to zero. Further, the fixed value can be also 500 to 2000 m other than the above-mentioned 1000 m.

However, the regression coefficient K1 is varied not only by the deflation but also the factor of the frictional coefficient (μ) of a road surface which is illustrated as follow.

That is, even if the same tires are used, the regression coefficient differs depending on a road surface with a low frictional coefficient and a road surface with a high frictional coefficient. For example, the road surface with a high μ becomes a small slip ratio as compared with that with a low μ, from the relation between the vehicle acceleration and the slip ratios (gradient: μ–s) in order to obtain the same acceleration (driving force). Further, since low internal pressure has a larger grounding area than high internal pressure, it is shifted to a direction of more gripping. Accordingly, the regression coefficient is varied to the same direction as a case that internal pressure was reduced, on a road surface with a high frictional coefficient in comparison with a road surface with a low frictional coefficient.

Consequently, when the deflation is judged from the above-mentioned regression coefficient, it is required to discriminate between the deflation and the change of the frictional coefficient of a road surface.

Accordingly, in the Embodiment, response according to the change of the frictional coefficient of a road surface is taken into consideration. A method of determining the above-mentioned regression coefficient is designed to be carried out only on a road with high μ such as asphalt which is stable in the frictional coefficient of a road surface. The reason why it is done so is that the frictional coefficient is unstable on a snow road, an icy surface road and the like. For example, when data by a lot of 1000 m are stored, the relation between the vehicle acceleration and the slip ratios is uneven; therefore it hardly occurs that the correlation coefficient exceeds a fixed value. Accordingly, since the regression coefficient is determined only on a road with a high μ, an false judgment caused by the change of the frictional coefficient of a road surface hardly occurs. Further, when a vehicle travels on a road with a low μ, the judgment value (regression coefficient) is shifted to a reverse direction against the deflation; therefore it does not become an false judgment. However, the unevenness of data is little on a clean compressed snow road and a regression coefficient different from that on a road with a high μ happens to be obtained. If a vehicle travels on such road surface for a long time just after operating the initialization switch, an erroneous initial setting is carried out. Therefore, when it travels on a road with a high μ such as asphalt, it is considered that it is determined that the internal pressure is reduced and an false warning is occasionally issued. Consequently, considering a case that a vehicle travels on a road with a low μ and the correlation coefficient was high, the regression coefficient obtained is required to be corrected.

Then, the procedures of correcting the regression coefficient are illustrated. After the difference of the left and right slip ratios (respective slip ratios of left front and rear wheels and right front and rear wheels) was determined from the wheel speeds of 4 wheels, the fluctuation of the difference, namely, unevenness is determined (step S3). After the fluctuations were stored until the above-mentioned fixed traveling distance (1000 m) (steps S5 and S6), the regression coefficient is corrected by the average value (SVALM) of the fluctuations (steps S11 to S13). Further, when the average fluctuation SVALM is a fixed value, for example, 0.3 or more even if the correlation coefficient R is larger than the above-mentioned fixed value (0.9), the condition of a road surface is not stable; therefore the regression coefficient K1 is rejected. Where the correlation coefficient was a fixed value (0.9) or more on a road with a low μ as describe above, the correction of the above-mentioned regression coefficient is going to ascertain the road with a low μ which could not be ascertained only by the relation between the vehicle acceleration and the slip ratios, by the average fluctuation of the left and right slip ratios which is another view. That is, it is recognized that the larger the fluctuations of the difference of the left and right slip ratios are, the lower the road with a low μ. When the value of the average fluctuation is a fixed value or less, the regression coefficient is corrected.

Figure 4:
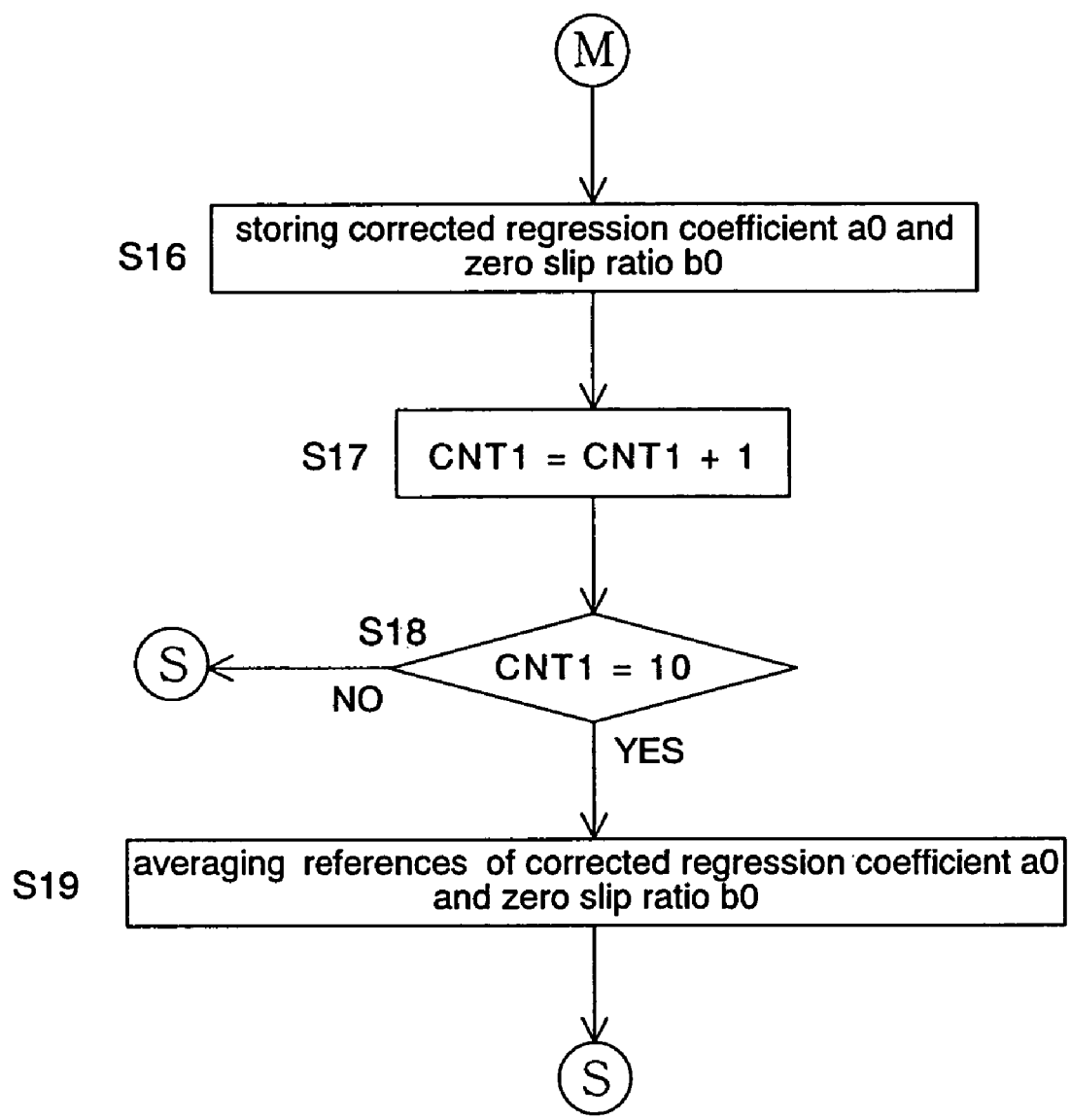
FIG. 4 is one example of flow charts related to the system for warning deflation of tires of the invention.

As shown in FIGS. 3 to 4, just after an initialization switch was preliminarily operated, a fixed number, for example, 10 of the regression coefficients of the slip ratios on the vehicle acceleration which were corrected in accordance with the above-mentioned average fluctuation of the difference of the left and right slip ratios are averaged, and its average value is stored as the reference correction regression coefficient $a0_{ave}$ at the reference internal pressure of tires (steps S15 to S19).

In the Embodiment, after the regression coefficient was corrected at the step S13, the vehicle acceleration which is the first determination index is considered in combination with the regression coefficient of the slip ratios of front and rear wheels. The slip ratios of front tires to rear tires in case of the vehicle acceleration of zero which is the second judgment index (zero slip ratios) is calculated (step S14).

The vehicle acceleration and the slip ratios of front and rear wheels which were used for determining the above-mentioned regression coefficient can be used for the second judgment index.

The values of the slip ratios of front and rear wheels in case of the vehicle acceleration of zero are determined from data of the vehicle accelerations and the slip ratios of front and rear wheels which were stored during the traveling at a fixed distance. Specifically, the vehicle acceleration is referred to as X and the slip ratio of front tires to rear tires is referred to as Y. When these are treated with the regression line, the regression coefficient is referred to as a.

$$Y = aX + b \tag{A}$$

The linear equation is obtained. Then, b is determined by substituting the average value $X_{ave}$ of the vehicle accelerations and the average value $Y_{ave}$ of the slip ratios of front and rear wheels which were stored during the traveling at a fixed distance in the above-mentioned equation (A). The b is the slip ratios of front and rear wheels in case of the vehicle acceleration of zero. The second judgment index is determined only when the correlation coefficient at determining the first determination index is a fixed value (0.9 in the Embodiment) or more.

A fixed number, for example, 10 of the slip ratios of front and rear wheels in case of the vehicle acceleration of zero are also averaged, and its average value is stored as the reference zero slip ratio $b0_{ave}$ at the reference internal pressure of tires (steps S15 to S19).

Figure 5:
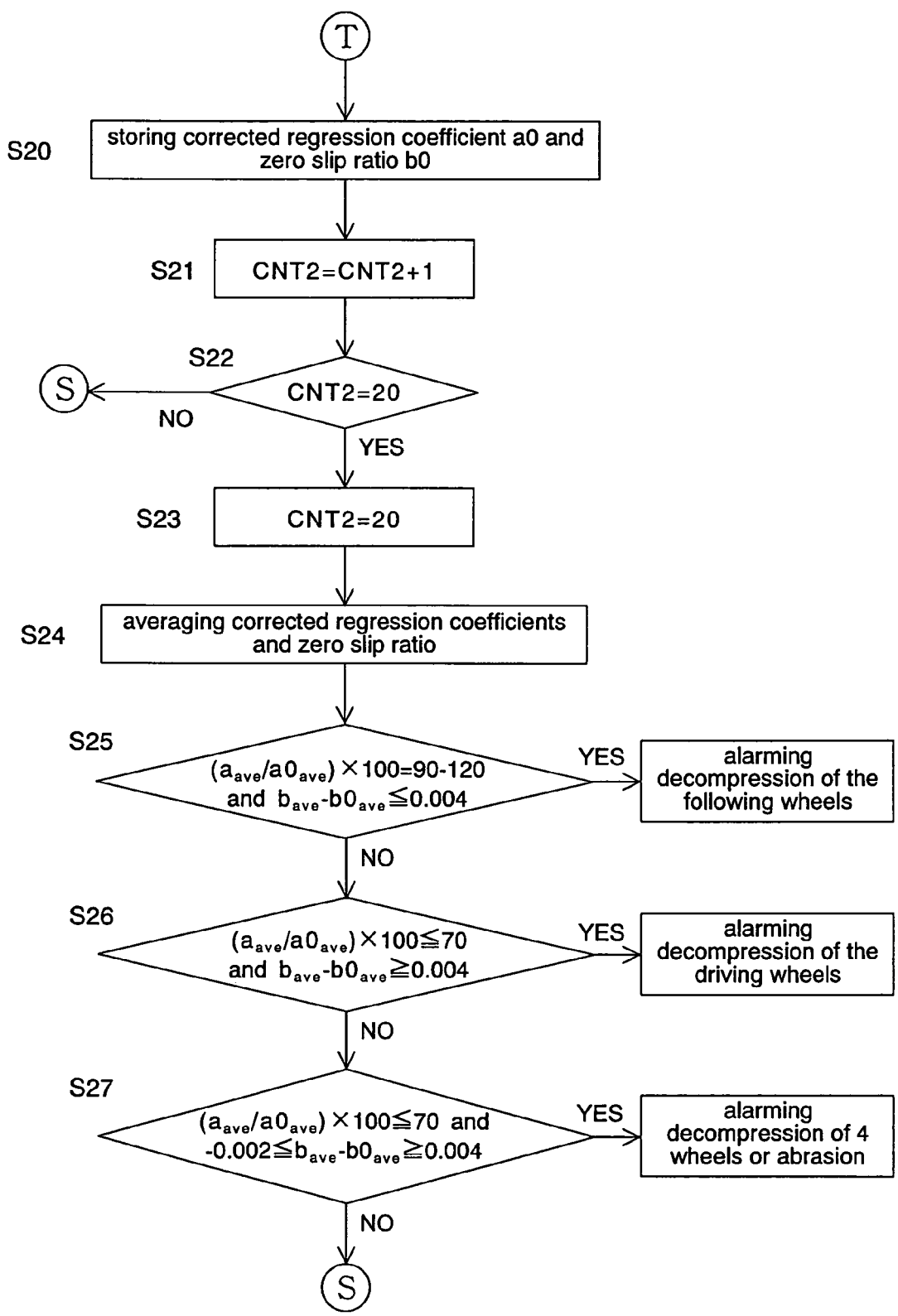
FIG. 5 is one example of flow charts related to the system for warning deflation of tires of the invention.

Then, as shown in FIGS. 3 to 5, thereafter, the correction regression coefficient a and the slip ratio b during traveling of a vehicle are calculated by the above-mentioned steps S1 to S15, the judgment value $a0_{ave}$ and the zero slip ratio $b0_{ave}$ as an average value of a fixed number, for example, 20 are determined (steps S20 to S23), and they are respectively compared with the above-mentioned reference correction regression coefficient $a0_{ave}$ and the reference zero slip ratio $b0_{ave}$ (step S24).

For example, when the ratio of $a_{ave}$ to $a0_{ave}$ (($a_{ave}/a0_{ave}$)× 100) and the difference of $b_{ave}$ and $b0_{ave}$ ($b_{ave} - b0_{ave}$) became the condition shown in Table 1, the respective determination results are informed to a driver using the above-mentioned deflation alarming device 3 (alarmed) (steps S25 to S27). Further, the above-mentioned threshold is set by preliminarily carrying out traveling experiments at normal internal pressure and a fixed reduced pressure by every vehicle.

TABLE 1

| ($a_{ave}/a0_{ave}$) × 100 | $b_{ave} - b0_{ave}$ | Judgment |
|---|---|---|
| 90 to 110 | −0.004 at most | Deflation of following wheels |
| 70 at most | 0.004 at least | Deflation of driving wheels |
| 70 at most | −0.002 to 0.002 | Deflation of 4 wheels or abrasion |

The procedures (1) to (14) of operations of the system for warning deflation of tires related to the Embodiment are illustrated below.

(1) Wheel speeds ($V1_n$, $V2_n$, $V3_n$ and $V4_n$) are calculated from respective rotational speeds of 4 wheel tires FL, FR, RL and RR of a vehicle.

For example, wheel speed data at a certain time of respective wheel tires FL, FR, RL and RR of a vehicle which were obtained by a sensor such as an ABS sensor are referred to as the wheel speeds $V1_n$, $V2_n$, $V3_n$ and $V4_n$.

(2) The average wheel speeds ($Vf_n$, $Vd_n$) of the following wheels and the driving wheels are calculated.

In case of front wheel drive, the average wheel speeds $Vf_n$ and $Vd_n$ of the following wheels and the driving wheels at a certain time are determined according to Formulae (1) and (2).

$$Vf_n=(V3_n+V4_n)/2 \quad (1)$$

$$Vd_n=(V1_n+V2_n)/2 \quad (2)$$

(3) The traveling distance of a vehicle at a unit time is calculated according to the following Formula (3).

$$DIST=Vf_n \times \Delta t \quad (3)$$

Hereat, $\Delta t$ is a time interval (sampling time) between the average wheel speeds $Vf_n$ and $Vf_{n-1}$ of the following wheels which are calculated from the wheel speed data.

(4) The difference SSR of the slip ratios of left front and rear wheels and right front and rear wheels is calculated according to the following Formula (4).

$$SSR=|V_1/V_3-V_2/V_4| \quad (4)$$

(5) The fluctuations SVAL of the above-mentioned difference SSR of the slip ratios are calculated according to the following Formula (5) and the average fluctuation SVALM is calculated by the above-mentioned every fixed traveling distance, for example, by every 1000 m with respect to the fluctuations SVAL.

$$SVAL_n=|SSR_n-SSR_{n-1}| \quad (5)$$

(6) The above-mentioned vehicle acceleration $Af_n$ (namely, the vehicle acceleration and deceleration of the following wheels) is calculated.

When the average wheel speed which is obtained from the wheel speed data by one before the above-mentioned average wheel speed $Vf_n$ of the following wheels is referred to as $Vf_{n-1}$, the vehicle acceleration $Af_n$ is determined according to the following Formula (6).

$$Af_n=(Vf_n-Vf_{n-1}))/\Delta t/g \quad (6)$$

Hereat, $\Delta t$ is a time interval (sampling time) between the wheel speeds $Vf_n$ and $Vf_{n-1}$ of the following wheels which is calculated from the wheel speed data and g is gravity acceleration.

(7) The slip ratios of front and rear wheels are calculated in accordance with the above-mentioned vehicle acceleration $Af_n$.

It does not occur that a vehicle is sliding at acceleration condition while the driving wheels are in lock condition ($Vd_n=0$, $Vf_n\neq0$). Also, it does not occur that the driving wheels generate wheel spin in speed reduction condition while a vehicle is in stop condition ($Vf_n=0$, $Vd_n\neq0$). The slip ratios $S_n$ are calculated from the following Formulae (7) and (8).

When $Af_n \geq 0$ and $Vd_n \neq 0 S_n=(Vf_n-Vd_n)/Vd_n$ (7)

When $Af_n < 0$ and $Vf_n \neq 0 S_n=(Vf_n-Vd_n)/Vf_n$ (8)

In case of other than the above-mentioned cases, $S_n=1$.

(8) The radius r of traveling circle of a vehicle is calculated from the wheel speeds of the above-mentioned following wheels and the tread widths Tr of the following wheels using the following Formula (9).

$$r=V3n-V4n/V3n+V4n \times 2 \times 1/Tr \quad (9)$$

(9) The moving averages of the slip ratios of front and rear wheels and the vehicle accelerations are calculated by every sampling time.

With respect to the slip ratios, $$MS_n=(S_1+S_2+\ldots+S_n)/N \quad (10)$$

$$MS_{n+1}=(S_2+S_3+\ldots+S_{n+1})/N \quad (11)$$

$$MS_{n+2}=(S_3+S_4+\ldots+S_{n+2})/N \quad (12)$$

With respect to the vehicle accelerations, $$MAf_n=(Af_1+Af_2+\ldots+Af_n)/N \quad (13)$$

$$MAf_{n+1}=(Af_2+Af_3+\ldots+Af_{n+1})/N \quad (14)$$

$$MAf_{n+2}=(Af_3+Af_4+\ldots+Af_{n+2})/N \quad (15)$$

The moving averages of slip ratios and the vehicle accelerations are stored until the traveling distances reach at a fixed distance. The regression coefficient and the correlation coefficient are determined from the moving averages.

(10) When the above-mentioned traveling distance is a fixed distance, the regression coefficient, namely, the regression coefficient K1 of the slip ratio of front and rear wheels on the vehicle acceleration, the regression coefficient K2 of the vehicle acceleration on the slip ratio of front and rear wheels and the correlation coefficient R are calculated.

$$K1 = \frac{\Sigma(MAf_i \times MS_i) - N \times \overline{MAf} \times \overline{MS}}{\Sigma MAf_i^2 - N \times \overline{MAf} \times \overline{MAf}} \quad (16)$$

$$K2 = \frac{\Sigma(MAf_i \times MS_i) - N \times \overline{MAf} \times \overline{MS}}{\Sigma MS_i^2 - N \times \overline{MS} \times \overline{MS}} \quad (17)$$

$\overline{MS}$ is a moving average of slip ratios. $\overline{MAf}$ is a moving average of vehicle accelerations.

Further, the correlation coefficient R is $$R=K1 \times K2 \quad (18)$$

(11) The value of the regression coefficient K1 is corrected in accordance with the above-mentioned average fluctuation SVALM. The regression coefficient K1 which is corrected was calculated from the slip ratio to the vehicle acceleration by the above-mentioned every fixed distance, and the correlation coefficient R exceeds a fixed value, for example, 0.9. When the average fluctuation SVALM is a fixed value of 0.3 or more even if the correlation coefficient R is larger than the above-mentioned fixed value, road surface condition is not stable; therefore the regression coefficient K1 is rejected.

As one example of the correction of the above-mentioned regression coefficient K1, it is judged that the larger the average fluctuation SVALM is, the lower the road with µ is, and it is corrected. For example, a value obtained by multiplying $\alpha$, for example, 0.1-fold to the average fluctuation SVALM is extracted from the regression coefficient K1. Furthermore, the value $\alpha$ is preliminarily set by an experiment by every vehicle.

Corrected regression coefficient=$K1-\alpha \times SVALM$ (19)

(12) The slip ratios b of front and rear wheels in case of the vehicle acceleration of zero is determined using the average value $X_{ave}$ of the vehicle accelerations which were accumulated during running a fixed distance, the average value $Y_{ave}$ of the slip ratios of front and rear wheels and the regression coefficient K1 corrected, according to the above-mentioned Formula (A) (Y=aX+b).

(13) The procedures hitherto are repeated from a count of zero to, for example, a repetition of 10 times. Then, when the count reaches at 10 times or more, the corrected regression coefficients are averaged and the reference corrected regression coefficient at the reference internal pressure of tires and the reference zero slip ratio are stored. Then, the above-mentioned regression coefficients and the slip ratios during traveling of a vehicle are calculated, the judgment of the corrected regression coefficient and the judgment value of the slip ratios are determined as an average value of a fixed number, for example, 20 and respectively compared with the above-mentioned reference values.

(14) When a ratio of the reference corrected regression coefficient $a0_{ave}$ to the corrected regression coefficient $a_{ave}$ (($a_{ave}/a0_{ave}$)×100) and the difference of the zero slip ratio $b_{ave}$ and the reference zero slip ratio $b0_{ave}$ become within a range shown in Table 1, the deflation is informed to a driver. Further, the threshold is set by preliminarily carrying out experiments by every vehicle.

Further, in the present invention, the simultaneous deflation of 4 wheels or the abrasion of tires can be detected for the deflation of 2 wheels at the same axle of the following wheels or the driving wheels by using the above-mentioned two judgment indexes. However, as described in the above-mentioned Japanese Unexamined Patent Publication No. 211925/2003, the discrimination of the simultaneous deflation of 4 wheels or the abrasion of tires can be carried out by watching a term from the pushing of an initialization switch by providing a timer, or by determining a total traveling distance in the above-mentioned calculation and watching whether the value exceeds a fixed reference value (for example, 20,000 km) or not. When an alarm was issued at a fixed term (for example, one year) or until a vehicle travels to a fixed distance (for example, 20,000 km) after operating the initialization switch (it was adjusted to the reference internal pressure when new tires were replaced), it can be judged that the internal pressure of tires were reduced.

EXAMPLE

Then, the present invention is illustrated based on Example, but the present invention is not limited to only Example.

A front drive vehicle was prepared and the systems for warning deflation of tires of the present invention were mounted on the vehicle.

In the present Example, measurement was carried out according to the flow charts shown in FIGS. 3 to 5, with respect to 7 cases that the internal pressures of tires are a normal internal pressure, reduced pressures by 30% and 50% for the driving wheels (front wheels), reduced pressures by 30% and 50% for the following wheels (front and rear wheels), and reduced pressures by 30% and 50% for 4 wheels, in order to study the judgment of the deflation of 2 wheel tires at the same axle and the simultaneous deflation of 4 wheel tires. Then, the regression coefficients of the slip ratio on the vehicle acceleration were measured and correction was carried out with the average fluctuation of the difference of the left and right slip ratios.

As a result, the corrected regression coefficient $a_{ave}$ and the zero slip ratio $b0_{ave}$ which were measured at normal internal pressure were respectively 0.037 and 0.0033.

Figure 6:
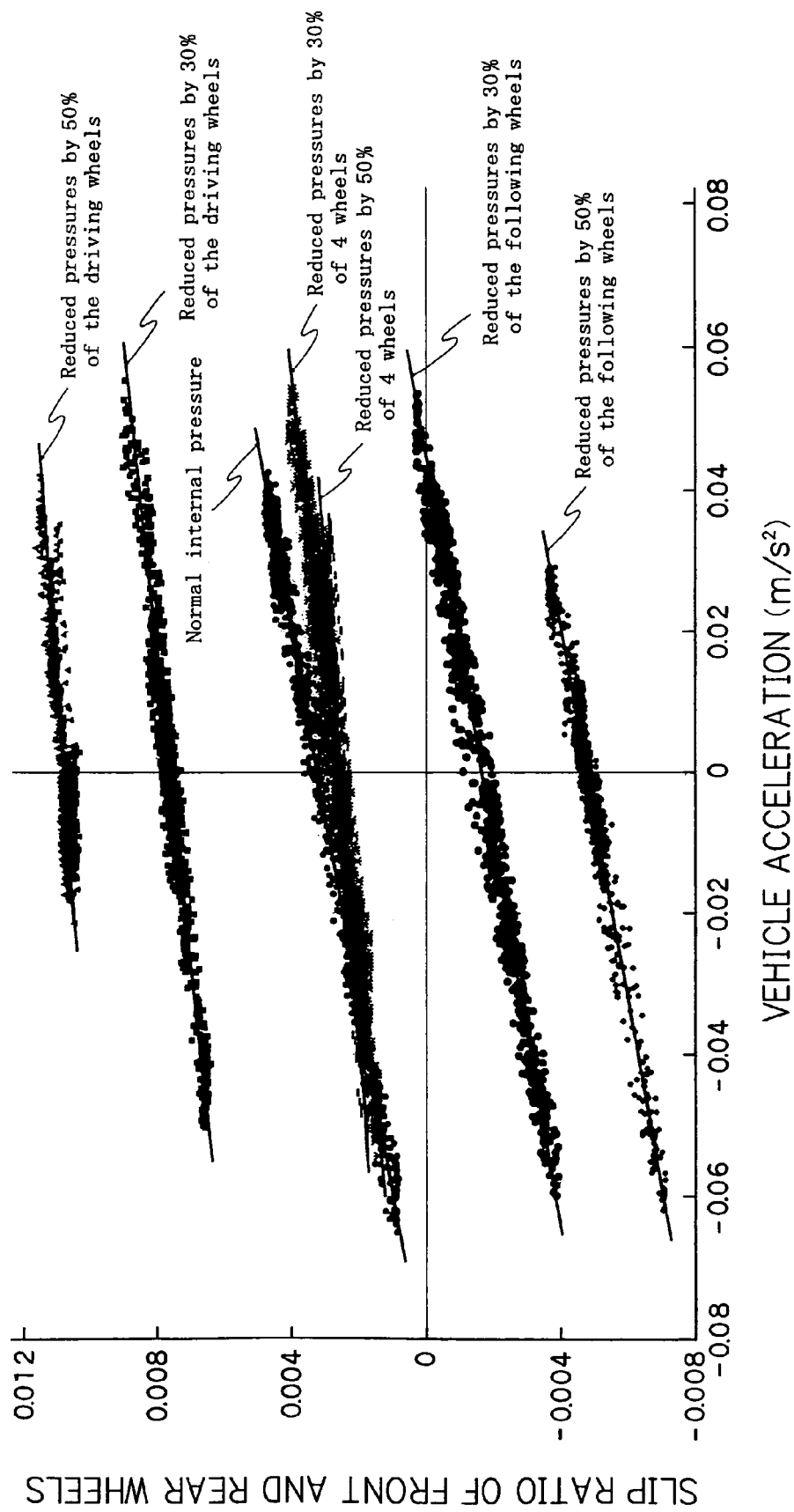
FIG. 6 is a chart showing one example of relations between vehicle accelerations and slip ratios of front and rear wheels which were calculated when the driving wheels, the following wheels and the four wheels were respectively deflated.

In FIG. 6 was shown the relation between the vehicle accelerations and the slip ratios of front and rear wheels which were calculated when the pressures of the driving wheels, the following wheels and 4 wheels were respectively reduced. The corrected regression coefficient $a_{ave}$ and the zero slip ratio $b0_{ave}$ in the respective cases were as shown in Table 2.

TABLE 2

|  | Reduced pressures by 30% of the driving wheels | Reduced pressures by 50% of the driving wheels | Reduced pressures by 30% of the following wheels | Reduced pressures by 50% of the following wheels | Reduced pressures by 30% of 4 wheels | Reduced pressures by 50% of 4 wheels |
|---|---|---|---|---|---|---|
| $a_{ave}$ | 0.023 | 0.015 | 0.037 | 0.036 | 0.024 | 0.016 |
| $b_{ave}$ | 0.0076 | 0.0108 | −0.0016 | −0.0048 | 0.0027 | 0.0025 |

The ratio with $a0_{ave}$ and the difference with $b0_{ave}$ at normal internal pressure which were determined were as shown in Table 3.

TABLE 3

|  | Reduced pressures by 30% of the driving wheels | Reduced pressures by 50% of the driving wheels | Reduced pressures by 30% of the following wheels | Reduced pressures by 50% of the following wheels | Reduced pressures by 30% of 4 wheels | Reduced pressures by 50% of 4 wheels |
|---|---|---|---|---|---|---|
| ($a_{ave}/a0_{ave}$) × 100 | 62 | 41 | 100 | 97 | 65 | 43 |
| $b_{ave} - b0_{ave}$ | 0.0043 | 0.0075 | −0.0049 | −0.0081 | −0.0006 | −0.0008 |

Accordingly, the deflation of 2 wheels at the same axle and the simultaneous deflation of 4 wheels or the abrasion of tires can be detected by setting the threshold of the deflation judgment as the following Table 4.

TABLE 4

| ($a_{ave}/a0_{ave}$) × 100 | $b_{ave} - b0_{ave}$ | Judgment |
|---|---|---|
| 90 to 110 | −0.004 at most | Deflation of the following wheels |

TABLE 4-continued

| $(a_{ave}/a0_{ave}) \times 100$ | $b_{ave} - b0_{ave}$ | Judgment |
|---|---|---|
| 70 at most | 0.004 at least | Deflation of the driving wheels |
| 70 at most | −0.002 to 0.002 | Deflation of 4 wheels or abrasion |

According to the present invention, since the judgment of the deflation is carried out based on the change of the slip ratios of front and rear wheels when the vehicle accelerations are zero together with the change of the regression coefficients of the vehicle acceleration and the slip ratios of front and rear wheels, not only the 2 wheels at the same axle of a driving axle but also that of a following axle can be detected. Further, the simultaneous deflation of 4 wheels and the abrasion of tires can be detected.

Accordingly, the safety of traveling by a vehicle can be enhanced by improving the scope of deflation judgment.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for warning deflation of tires by detecting deflation of tires based on rotational information obtained from tires mounted on a vehicle, comprising the steps of:
   detecting the rotational information of each of said tires;
   calculating and storing wheel speeds, vehicle accelerations, slip ratios of front and rear wheels, traveling distances and radii of travel paths of said vehicle from the rotational information of respective tires;
   calculating moving average of said vehicle accelerations and slip ratios of front and rear wheels;
   accumulating the traveling distances and storing said moving averages of acceleration and the slip ratios of front and rear wheels when a radius of a travel path of said vehicle is a fixed value or more;
   determining regression coefficient and correlation coefficient of said slip ratio of front and rear wheels on vehicle acceleration where said accumulated traveling distance is a fixed distance or more;
   determining slip ratios of front and rear wheels while said vehicle accelerations are zero;
   determining whether the pressures of at least 2 wheels on the same axle or 4 wheels we simultaneously reduced or not, based on said regression coefficient when said correlation coefficients are a fixed value or more and the slip ratios of front and rear wheels while the vehicle accelerations are zero; and
   warning deflation of tires based on the result of said deflation judgment.

2. A method for warning deflation of tires of claim 1, wherein said slip ratios of front and rear wheels while the vehicle accelerations are zero are obtained by a linear equation including said regression coefficient.

3. A method for warning deflation of tires of claim 1 or 2, said step of judging deflation, including the steps of:
   comparing said regression coefficient with the reference value of regression coefficient preliminarily determined by said step of determining regression coefficient at the normal internal pressures of tires; and
   comparing said slip ratio of front and rear wheels at zero acceleration with the reference value of slip ratio of front and rear wheels preliminarily determined by said step of determining slip ratio at zero acceleration at normal internal pressures of tires.

4. A method for warning deflation of tires of claim 1 or 2, further comprising the steps of:
   calculating fluctuation of difference between slip ratio of left front and rear tires and slip ratio of right front and rear tires from said wheel speeds of respective tires; and
   correcting said regression coefficient in accordance with average of said fluctuation of difference by every fixed distance of traveling.

5. A system for warning deflation of tires by detecting deflation of tires based on rotational information obtained from tires mounted on a vehicle, comprising:
   means for detecting the rotational information of each of said tires;
   means for calculating and storing wheel speeds, vehicle accelerations, slip ratios of front and rear wheels, traveling distances and radii of travel paths of said vehicle from said rotational information of tires;
   means for calculating moving average of said vehicle accelerations and slip ratios of front and rear wheels;
   means for accumulating said traveling distances and storing said moving average of vehicle accelerations and the slip ratios of front and rear wheels while a radius of a travel path of vehicle is a fixed value or more;
   means for determining regression coefficient and correlation coefficient of said slip ratio of front and rear wheels on vehicle acceleration where said accumulated traveling distance is a fixed distance or more;
   means for determining the slip ratios of front and rear wheels while said vehicle acceleration is zero;
   means for determining whether the pressures of at least 2 wheels on the same axle or 4 wheels are simultaneously reduced or not, based on said regression coefficient when said correlation coefficients are a fixed value or more and the slip ratios of front and rear wheels while the vehicle accelerations are zero; and
   means for warning deflation of tires based on the result of said deflation judgment.

6. A system for warning deflation of tires of claim 5, said means for determining the slip ratios of front and rear wheels while said vehicle acceleration is zero, including means for determining slip ratio of front and rear wheels while said vehicle acceleration is zero, from a linear equation including said regression coefficient.

7. A system for warning deflation of tires of claim 5 or 6, said means for judging deflation, including:
   means for comparing said regression coefficient with the reference value of regression coefficient preliminarily determined by said step of determining regression coefficient at the normal internal pressures of tires; and
   means for comparing said slip ratio of front and rear wheels at zero acceleration with the reference value of slip ratio of front and rear wheels preliminarily determined by said step of determining slip ratio at zero acceleration at normal internal pressures of tires.

8. A system for warning deflation of tires of claim 5 or 6, further comprising:
   means for calculating fluctuation of difference between slip ratio of left front and rear tires and slip ratio of right front and rear tires from said wheel speeds of respective tires; and means for correcting said regression coefficient in accordance with average of said fluctuation of difference by every fixed distance of traveling.

9. A machine-readable, medium carrying a program for judging deflation of tires mounted on a vehicle, the program, when executed, performing a method comprising the steps of:

calculating and storing wheel speeds, vehicle accelerations, slip ratios of front and rear wheels, traveling distances and radii of travel paths of said vehicle from rotational information of tires;

calculating moving average of said vehicle accelerations and slip ratios of front and rear wheels;

accumulating said traveling distances and storing said moving average of vehicle accelerations and the slip ratios of front and rear wheels while a radius of a travel path of vehicle is a fixed value or more;

determining regression coefficient and correlation coefficient of said slip ratio of front and rear wheels on vehicle acceleration where said accumulated traveling distance is a fixed distance or more;

determining the slip ratios of front and rear wheels while said vehicle acceleration is zero; and determining whether the pressures of at least 2 wheels on the same axle or 4 wheels are simultaneously reduced or not, based on said regression coefficient when said correlation coefficients are a fixed value or more and the slip ratios of front and rear wheels while the vehicle acceleration is zero.

10. The machine-readable medium carrying a program for judging deflation of tires, as recited in claim 9, wherein the method performed further comprises the steps of:

calculating fluctuation of difference between slip ratio of left front and rear tires and slip ratio of right front and rear tires from said wheel speeds of respective tires; and correcting said regression coefficient in accordance with an average of said fluctuation of difference for each fixed distance of traveling.

* * * * *